US006933038B2

(12) United States Patent
Nanko et al.

(10) Patent No.: US 6,933,038 B2
(45) Date of Patent: Aug. 23, 2005

(54) FIBER REINFORCED MINERAL-BASED MATERIALS AND METHODS OF MAKING THE SAME

(75) Inventors: Hiroki Nanko, Fayetteville, GA (US); Kimberly E. Kurtis, Atlanta, GA (US)

(73) Assignee: Institute of Paper Science and Technology, Inc., Atlanta, GA (US)

( * ) Notice: Subject to any disclaimer, the term of this patent is extended or adjusted under 35 U.S.C. 154(b) by 627 days.

(21) Appl. No.: 10/013,200

(22) Filed: Nov. 6, 2001

(65) Prior Publication Data

US 2002/0160174 A1 Oct. 31, 2002

Related U.S. Application Data

(60) Provisional application No. 60/246,278, filed on Nov. 6, 2000.

(51) Int. Cl.[7] .................................................. B32B 3/00
(52) U.S. Cl. ........................ 428/191; 428/323; 428/364; 428/372; 428/311.71; 264/109; 264/333; 427/212; 427/444; 106/609; 106/730; 106/731; 162/218
(58) Field of Search ................................ 264/109, 333, 264/86, 87, 33; 427/212, 444; 428/323, 364, 311.71, 191, 372; 106/609, 730, 731; 162/218, 225

(56) References Cited

U.S. PATENT DOCUMENTS

| | | |
|---|---|---|
| 3,753,749 A | 8/1973 | Nutt |
| 4,003,752 A | 1/1977 | Isohata et al. |
| 4,075,027 A | 2/1978 | Knill et al. |
| 4,126,937 A | 11/1978 | Ellis et al. |
| 4,166,749 A | 9/1979 | Sterrett et al. |
| 4,249,905 A | 2/1981 | Caswell |
| 4,330,335 A | 5/1982 | Kato et al. |
| 4,351,486 A | 9/1982 | Schmöller et al. |
| 4,362,510 A | 12/1982 | Brauer et al. |
| 4,367,094 A | 1/1983 | Fujimaru et al. |
| 4,369,201 A  * | 1/1983 | Kober ........................... 427/4 |
| 4,373,035 A | 2/1983 | Bowen |
| 4,400,217 A | 8/1983 | Kober |
| 4,407,222 A | 10/1983 | Kimura et al. |
| 4,486,501 A | 12/1984 | Holbek |
| 4,542,172 A | 9/1985 | Jochum et al. |
| 4,608,089 A | 8/1986 | Gale et al. |
| 4,647,505 A | 3/1987 | Blackie et al. |
| 4,859,186 A | 8/1989 | Ranly |
| 4,886,843 A | 12/1989 | Walton |

(Continued)

FOREIGN PATENT DOCUMENTS

| | | |
|---|---|---|
| CH | 461340 | 8/1968 |
| EP | 0-310-100 | 4/1989 |
| FR | 930962 | 2/1948 |
| JP | 01-141849 | 6/1989 |
| JP | 05-148002 | 6/1993 |
| WO | WO 99/67183 | 12/1999 |
| WO | WO 00/26452 | 5/2000 |
| WO | WO 02/28796 A2 | 4/2002 |

OTHER PUBLICATIONS

L. Tu et al., "Surface Modified Polypropylene Fibres for Use in Concrete," Magazine of Concrete Research, vol. 50, No. 3, 1998, pp. 209–217.

State–of–the–Art Report on Fiber Reinforced Concrete, Reported by ACI Committee 544, Nov. 18, 1996.

Primary Examiner—Merrick Dixon
(74) Attorney, Agent, or Firm—Finnegan, Henderson, Farabow, Garrett & Dunner, L.L.P.

(57) ABSTRACT

The present invention relates to a method for reinforcing mineral-based materials using reinforced fiber material. More particularly, the present invention relates a method for more uniformly dispensing a fiber material with a mineral-based material, such as cement paste.

40 Claims, 7 Drawing Sheets

U.S. PATENT DOCUMENTS

| | | | |
|---|---|---|---|
| 4,895,517 A | | 1/1990 | Fischer |
| 4,949,743 A | | 8/1990 | Broom |
| 4,985,119 A | * | 1/1991 | Vinson et al. .............. 162/149 |
| 5,000,824 A | | 3/1991 | Gale et al. |
| 5,008,035 A | | 4/1991 | Broom |
| 5,018,459 A | | 5/1991 | Judd |
| 5,047,086 A | | 9/1991 | Hayakawa et al. |
| 5,054,406 A | | 10/1991 | Judd |
| 5,102,596 A | | 4/1992 | Lempfer et al. |
| 5,153,299 A | | 10/1992 | Kawamura et al. |
| 5,198,082 A | | 3/1993 | Vennesland et al. |
| 5,224,595 A | | 7/1993 | Sugimoto et al. |
| 5,233,012 A | | 8/1993 | Kawamura et al. |
| 5,241,795 A | | 9/1993 | Giroux et al. |
| 5,328,563 A | | 7/1994 | Henricson et al. |
| 5,330,573 A | | 7/1994 | Nakano et al. |
| 5,330,621 A | | 7/1994 | Visuri et al. |
| 5,372,678 A | * | 12/1994 | Sagstetter et al. .......... 162/225 |
| 5,385,764 A | | 1/1995 | Andersen et al. |
| 5,392,721 A | | 2/1995 | Judd |
| 5,405,502 A | | 4/1995 | Palmu et al. |
| 5,453,310 A | | 9/1995 | Andersen et al. |
| 5,500,044 A | | 3/1996 | Meade et al. |
| 5,520,725 A | | 5/1996 | Kato et al. |
| 5,538,619 A | | 7/1996 | Miller |
| 5,631,052 A | | 5/1997 | Andersen et al. |
| 5,641,584 A | | 6/1997 | Andersen et al. |
| 5,643,359 A | | 7/1997 | Soroushian et al. |
| 5,654,048 A | | 8/1997 | Andersen et al. |
| 5,656,733 A | | 8/1997 | Suchanec |
| 5,669,969 A | | 9/1997 | Meade et al. |
| 5,679,149 A | | 10/1997 | Tezuka et al. |
| 5,702,521 A | | 12/1997 | Suchanec |
| 5,705,237 A | | 1/1998 | Andersen et al. |
| 5,767,176 A | | 6/1998 | Nakanishi et al. |
| 5,785,419 A | | 7/1998 | McKelvey |
| 5,844,019 A | | 12/1998 | Kato |
| 5,868,940 A | | 2/1999 | Gurfinkel |
| 5,897,701 A | | 4/1999 | Soroushian et al. |
| 5,919,424 A | | 7/1999 | Klyosov et al. |
| 5,968,999 A | | 10/1999 | Ramp et al. |
| 5,989,335 A | | 11/1999 | Soroushian et al. |
| 6,013,116 A | | 1/2000 | Major et al. |
| 6,046,269 A | | 4/2000 | Nass et al. |
| 6,063,856 A | | 5/2000 | Mass |
| 6,074,524 A | | 6/2000 | Wu et al. |
| 6,558,081 B2 | * | 5/2003 | Hull ........................... 405/157 |

* cited by examiner

FIBER REINFORCED MINERAL-BASED MATERIALS AND METHODS OF MAKING THE SAME

Pursuant to 35 U.S.C.§119, Applicants hereby claim the benefit of the filing date of U.S. Provisional Patent Application No. 60/246,278 filed on Nov. 6, 2000.

FIELD OF THE INVENTION

The present invention relates to a method for reinforcing mineral-based materials using reinforced fiber material. More particularly, the present invention relates a method for more uniformly dispersing a fiber material within a mineral-based material, such as cement paste.

BACKGROUND OF THE INVENTION

With an annual production of twelve billion tons, concrete has emerged as the material of choice for modern infrastructure construction. Portland cement concrete, a mineral-based material, is a composite material produced from proportioned mixtures of water, Portland cement, fine and coarse aggregates, and in some cases, mineral admixtures, chemical admixtures, and fibers. The products of cement hydration bind the aggregate particles together. Inherent in the microstructure of concrete are voids and cracks, ranging in size from microscale to macroscale. These voids and cracks can influence the mechanical behavior of the product. The presence of such flaws coupled with the generally brittle nature of concrete cause the tensile strength of concrete to be only ⅛ to 1/12 its compressive strength.

In order to enhance the properties, fibers have been used in various cement-based materials, including mortar, concrete, and fiber-cement products. Fibers conventionally used in concrete construction generally range from 30–60 mm in length. While randomly distributed fibers of this size can improve certain mechanical properties of concrete, mixing and dispersion are typically more demanding because of the likelihood of fiber "balling" or flocculation and non-uniform dispersion. Finishing is also challenging because "fuzzing" of fibers at the concrete surface can occur. These difficulties in mixing and dispersing the fiber limit the fiber volume that may be practically incorporated in concrete to 2% or less by volume. In addition, to non-uniform dispersion, steel, glass, and synthetic polymer fibers may increase the cost of concrete by 10–50%, rendering their use less cost effective.

Another source of fiber used for reinforcing mineral-based materials is asbestos fibers. However, the use of these fibers is hazardous and requires the provision of safety measures. In addition, due to their nature, asbestos fibers have a tendency to form clusters and bundles. For these reasons, asbestos have generally been replaced by other wood-based fibers.

Wood-based fibers, which range from 1 to 4 mm in length and are tens of microns in diameter, are similar to other types of microfibers previously investigated for concrete reinforcement. Also the tensile strength and elastic modulus of microfibers vary with material type. Wood pulp fibers were found to be comparable to the other types of fibers. The hydrophilic surfaces of cellulose fibers may facilitate their dispersion and bonding to the cement paste. Since fibers have a very large aspect ratio of length to width, and they are very flexible, the fibers tend to be entangled forming flocs, which are very difficult to break up into individual fibers. The fibers in the dry pulp are bonded strongly by hydrogen bonds. When the dry pulp is wetted, water breaks most of the hydrogen bonds, however mechanical entanglement still remains and makes the dispersion of the fibers very difficult. Strong shear force is required to disperse the entangled fibers. Therefore, if well dispersed, the relatively high surface area and the close spacing of pulp fibers, when combined with their desirable mechanical characteristics, make them effective in suppression and stabilization of microcracks in a concrete matrix.

The dispersion of pulp fibers are effective when used in small quantities or volume fractions, like 0.1% or less, but higher fiber contents may cause the balling and poor distribution throughout the cement paste matrix. Rather than improving the properties of a mineral-based material, fibers which are not well distributed through the cement paste matrix act instead as defects, creating points of weakness in the composite. Balling or clumping of poorly distributed fibers may cause a decrease in the mechanical characteristics and the durability of the bulk composite.

A major challenge to the introduction of pulp fibers to the cement-based matrix is the uniform dispersion of the fibers throughout the matrix. The pulp fibers in their original form are very difficult to disperse in an inorganic binder, such as a cement paste matrix.

The Inventors have developed a method for effectively reinforced mineral-based materials. The Inventors have developed a method that improves the dispersion of reinforcing fibers into the mineral-based materials. The Inventors have further developed a low-cost method, to improve dispersion and bonding of fibers in mineral-based materials, resulting in composite materials with enhanced performance for a variety of applications such reduction of early age cracking and reduction of shrinkage cracking.

SUMMARY OF THE INVENTION

According to the present invention there is disclosed a method for reinforcing mineral-based material comprising contacting at least one mineral-based material with at least one reinforced fiber material. The present invention discloses a composition comprising at least one mineral-based material and at least one reinforced fiber material.

The present invention can provide improvement in one or more of the following properties: compressive strength, volume stability, crack resistance, toughness, ductility, durability, reduces of shrinkage, fire performance, post peak loading behavior, improved tensile strength, paintability, workability, flowability, and finishability.

DETAILED DESCRIPTION OF THE INVENTION

It has been discovered that reinforcement of mineral-based materials can be achieved by incorporating reinforced fiber materials into the mineral-based materials. Therefore, in one embodiment of the invention, we provide a method of reinforcing mineral-based materials using reinforced fiber materials.

According to the present invention mineral-based material is any material for any solid mineral based material particularly for use in environments where strength is an issue, non-limiting examples, include buildings, bridges, pavements, sidewalks, precast concrete products, floors, roads, drainage, stones, bricks, siding, roofing. Non-limiting examples of mineral-based materials are cement based material, clay-based material, asphalt-based material, mortar, concrete, ceramic tile, grout, and terrazzo. Cement-based material generally comprise at least one of lime, alumina, silica, calcium silicates, calcium, silicon, aluminum, iron, iron oxide, sulfate, gypsum, calcium sulfate, calcium aluminates, and calcium sulfoaluminates. Examples of cement based materials are aluminous cement, blast furnace cement, Type I portland cement, Type IA portland cement, Type II portland cement, Type IIA portland cement, Type III portland cement, Type IIIA, Type IV portland cement, Type V portland cement, hydraulic cement such as white cement, gray cement, blended hydraulic cement, Type IS-portland blast-furnace slag cement, Type IP and Type P-portland-pozzolan cement, Type S-slag cement, Type I (PM)-pozzolan modified portland cement, and Type I (SM)-slag modified portland cement, Type GU-blended hydraulic cement, Type HE-high-early-strength cement, Type MS-moderate sulfate resistant cement, Type HS-high sulfate resistant cement, Type MH-moderate heat of hydration cement, Type LH-low heat of hydration cement, Type K expansive cement, Type O expansive cement, Type M expansive cement, Typse S expansive cement, regulated set cement, very high early strength cement, high iron cement, and oil-well cement, further concrete fiber cement deposits and any composite material including any of the above listed cement.

The different types of cement may be characterized by The American Society for Testing and Materials (ASTM) Specification C-150. For example, Type I portland cement is a normal, general-purpose cement suitable for all uses. It is used in general construction projects such as buildings, bridges, floors, pavements, and other precast concrete products. Type IA portland cement is similar to Type I with the addition of air-entraining properties. Type II portland cement generates less heat at a slower rate and has a moderate resistance to sulfate attack. Type IIA portland cement is identical to Type II and produces air-entrained concrete. Type III portland cement is a high-early-strength cement and causes concrete to set and gain strength rapidly. Type III is chemically and physically similar to Type I, except that its particles have been ground finer. Type IIIA is an air-entraining, high-early-strength cement. Type IV portland cement has a low heat of hydration and develops strength at a slower rate than other cement types, making it ideal for use in dams and other massive concrete structures where there is little chance for heat to escape. Type V portland cement is used only in concrete structures that will be exposed to severe sulfate action, principally where concrete is exposed to soil and groundwater with a high sulfate content.

The mineral-based material may be made in any method known to those skilled in the arts. For example, Portland cement, the fundamental ingredient in concrete, is a calcium silicate cement made with a combination of calcium, silicon, aluminum, and iron. Portland cement generally comprises a combination of limestone, shells or chalk, and shale, clay, sand, and/or iron ore. The raw materials are then reduced in size by means of, for example, a crusher. The materials are proportioned to create a cement with a specific chemical composition. Two different methods, dry and wet, can be used to manufacture portland cement. In the dry process, dry raw materials are proportioned, ground to a powder, blended together and fed to the kiln in a dry state. In the wet process, a slurry is formed by adding water to the properly proportioned raw materials. The grinding and blending operations are then completed with the materials in slurry form. After blending, the mixture of raw materials is fed into the upper end of a tilted rotating, cylindrical kiln. The mixture passes through the kiln at a rate controlled by the slope and rotational speed of the kiln. Burning fuel consisting of powdered coal or natural gas is forced into the lower end of the kiln. Inside the kiln, raw materials reach temperatures of 2600° F. to 3000° F. (1430° C. to 1650° C.). At 2700° F. (1480° C.), a series of chemical reactions cause the materials to fuse and create cement clinker-grayish-black pellets, often the size of marbles. Clinker is discharged red-hot from the lower end of the kiln and transferred to various types of coolers to lower the clinker to handling temperatures. Cooled clinker is combined with gypsum and ground into a fine gray powder. The clinker is ground so fine that nearly all of it passes through a No. 200 mesh (75 micron) sieve. This fine gray powder is portland cement.

Other methods for obtaining mineral-based materials may also be used for the present invention. Mineral-based material may be in any form known to those or ordinary skilled in the art. For example, mineral-based material may be in a ready mixed form, wherein it is batched at local plants. Another example form of mineral-based material may be precast mineral-based products such as concrete bricks, paving stones, bridge girders, structural components, and panels for cladding. Yet another example of mineral-based material form is mineral masonry such as roofing tiles, shake shingles, lap siding, and countertops.

Aggregates as used herein, unless otherwise stated, refer to granular materials such as sand, gravel, or crushed stone. Aggregates may be divided into two distinct categories such as fine and coarse. An example of fine aggregates includes natural sand or crushed stone with most particles passing through a ⅜-inch (9.5-mm) sieve. An example of coarse aggregates includes particles greater than 0.19 inch (4.75 mm), but generally range between ⅜ and 1.5 inches (9.5 mm to 37.5 mm) in diameter, e.g., gravel. Aggregates such as natural gravel and sand may be dug or dredged from a pit, river, lake, or seabed. Crushed aggregate may be produced by crushing quarry rock, boulders, cobbles, or large-size gravel. Another example of aggregates may be recycled mineral-based material such as concrete.

Chemical admixtures as used herein, unless otherwise stated, refers to any compositions for the use in air-entraining, water-reducing, retarding, accelerating, plasticizing, corrosion inhibition, shrinkage reduction, alkali-silica reactivity reduction, workability enhancement, bonding, damp proofing, or coloring for mineral-based material.

Fiber materials, according to the present invention, are chosen from at least one of cellulosic fibers, recycled fibers, mechanical pulp such as mechanical pulp such as thermo-mechanical pulp, and synthetic fibers. Cellulosic fibers are derived from plants. Examples of cellulosic fibers are woody fiber such as hardwood fiber such as fibers on broad leaf trees such as oak, aspen, birch, and beech, and softwood fiber such as fibers from coniferous trees such as slash pine, jack pine, white spruce, logepole pine, redwood, or douglas fir, and non-woody fibers, such as hemp flax, bagasse, mailla, cotton, ramie, jute abaca, banana, kenaf, sisal hemp, wheat, rice, bamboo, and pineapple. Recycled fiber are derived from paper products, such as, for example old corrugated container, old magazine grade, old newsprint, mixed office waste, tissue, or napkin. Synthetic fibers, according to the present invention, are any fibers non-naturally occurring. Examples of synthetic fibers include, but are not limited to glass fiber, metallic fiber such as steel fiber, which includes boron fiber and aluminum fiber, acrylic fiber, nylon fiber, rayon fiber, polyester fiber, polystyrene fiber, cellulose acetate fiber, acetate base fiber, polypropylene fiber, polyacrylamide fiber, polyethylene fiber, carbon fiber, and aramid fiber. According to one embodiment of the present invention, the fiber materials according to the present invention can be from about 0.01 mm to about 80 mm in length. Further, the fiber can range from about 30 mm to about 60 mm in length. Still further, the fiber range can be from 1 mm to about 4 mm in length.

Yet another embodiment of the present invention, provides a method for creating reinforced fiber materials. Reinforced fiber materials according to the present invention provide improved product properties when dispersed in mineral-based materials. The fiber material according to the present invention may be wet or dry. The mixture may be dried according to any method known in the art. For example, the mixture may be subjected to filtration, vacuum, or flash drying.

Reinforced fiber material comprises either at least one fiber material as described above, and at least one coordinating material or a treated fiber material capable of dispersion or bonding within the mineral-based material. Coordinating materials are any material that 1) allows separation or dispersion of fiber materials which results in improved dispersion when mixed with a mineral-based material; or 2) that improves bonding between the fibers and the mineral-based material. Examples of coordinating materials include, but are not limited to silica-rich materials such as fly ash and silica fume; slag; aluminosilicate such as heat-treated clay, metakaolin, clay; fines from crushed rock; fine sand; silica gel; talc; calcium carbonates such as precipitated calcium carbonate and grounded calcium carbonate; aluminum sulfate as known as alum; wood ash; polymers that can adsorb or bond to fiber materials such as anionic polymers and cationic polymers such as potato starch and corn starch; surfactants; water; and saw dust.

Improved dispersion and/or improved bonding of fiber based materials to mineral-based materials results in a composite material having enhanced performance for a variety of applications. For example, by improving dispersion and/or bonding, fiber materials may be incorporated into mineral-based materials at demonstrated volume fractions, but with improved workability, affording improved strengths and more efficient construction or production. In addition, higher fiber volume fractions may be incorporated into mineral-based materials, without requiring any additional machinery or technology, such as extruders or specialized mixing tools. Products having higher volume fractions can maintain improved workability and strength. Strengthening the bond between the fiber and the surrounding matrix also can allow for more efficient transfer of tensile stress to the fiber.

To improve the distribution and/or the bonding of fiber based materials with the mineral-based material matrix, such as cement, the fibers, such as plant fibers, may be treated using any art recognized method including mechanical or chemical treatment or a combination of both. Without being bound by theory, the inherent chemical characteristics of plant fibers affect their dispersion in water, and, hence, in cement-based materials. First, plant fiber is hydrophilic, and as a result, the ability of the plant fiber to adsorb water is high. This can adversely affect the workability, placement, and compaction of cement composites resulting in higher void contents and lower strength. Second, because the plant fibers are composed primarily of cellulose (60–80%, depending upon processing), drying of the fibers can cause an increase in the number and strength of hydrogen bonds in the cellulose. When fibers are introduced to water, the typical chemical behavior includes the polar attraction of the water molecules to each other and to the hydroxyl groups covering the cellulose surface. As the water is evaporated, the hydroxyl groups of cellulose surface ultimately link together by means of hydrogen bonding. Mechanical action may aid in fiber separation. If the plant fiber is allowed to flocculate together or "ball", the properties of reinforced mineral-based material will be negatively affected. Instead of acting to improve the mechanical properties of the mineral-based material, poorly dispersed or clumped plant fiber can act as a weak point inside the composite. Cement material can hardly penetrate into the flocculated fibers. In addition, swelling of the fiber clumps, in response to moisture fluctuations, may be more disruptive to the matrix than swelling of well-dispersed fibers.

Mechanical bonding between the fibers and the mineral-based material may be improved by beating the plant fibers. Fiber beating, fiber refining, or fibrillation is a common mechanical process in the papermaking industry. According to one embodiment of the present invention, two operations are involved in this mechanical treatment. The first is called pulping or dispersion. In this stage, the dry pulp is dispersed in water to form a slurry. The second operation is beating. The major effects of the beating process are: removing the primary wall of the fibers, penetration of the water into the fiber cell wall, breaking some of the intra-fiber hydrogen bonding, and replacing it with water-fiber hydrogen bond, external fibrillation by peeling some of the microfibrils in the S1 layer of the fibers, and fiber shortening. According to one embodiment of the present invention, beating refers to the mechanical action of fibrillating the fiber surface, essentially creating many "branches" or extensions from the fiber surface to improve the bonding effect between the fiber and the matrix of the mineral based material.

Fibrillation or fiber refining can be achieved by any art recognized methods such as for example disc refiner, conical refiner, and valley beater. The degree of refining is measured by the Canadian Standard Freeness (CSF) test. The CSF is defined as "the number of milliliters of water collected from the side orifice of the standard tester when pulp drains through an perforated plate at 0.30% consistency and 20° C." (G. A. Smook 1982). Refining is preferably selected to fibrillate the external surface of the fiber to increase the surface area for better bonding with the mineral based material and/or coordinating material. The fibrillated surface also is advantageous for capturing mineral-based material and/or coordinating material. Beating may give better flexural performance.

Chemical treatment of the fiber material may also improve fiber dispersion. Fibers can be introduced to coordinating materials to improve dispersion and/or bonding between the fiber and the matrix of the mineral-based material. Coordinating materials have been found to separate fiber materials from one another and/or improve bonding with the surrounding mineral-based material paste. In addition, coordinating materials on the surface of the fiber materials may make it difficult for the microfibrils to collapse back to the fiber surface.

By introducing a coordinating materials to the fibers during processing, the coordinating materials may contain positively charged side groups may become strongly attracted to the negatively-charged sites on the fibers. Because these coordinating materials can contain a cationic site or sites, they are capable of bonding with the negatively charged fiber, thereby making the surface of the fiber neutral or positively charged fiber surfaces advantageous for capturing negatively charged coordinating material.

The mixing of the mineral-based material and reinforced fiber materials can be carried out in any manner known in the art. For example, the fiber material may be introduced with the coordinating materials, and then the combined mixture may be introduced to the mineral-based material. Another example of the mixing procedure may be to introduce the fiber material, coordinating material, and mineral-based material simultaneously. A further example may be to contact the mineral-based material with the coordinating material and then combine the mixture with the fiber material. An even further example of the mixing procedure may be to contact the fiber material with the mineral based material and then combine the mixture with the coordinating material. Additionally, the fiber material and the mineral based material may be mixed without the addition of the coordinating material, resulting in somewhat decreased binding of the mineral to the fiber. Still further, the reinforced fiber may be added with the mineral-based material. The fiber material can range from about 0.001% to about 50% of the total volume of the reinforced fiber and the coordinating material (hereinafter referred to as composite). Further the fiber material can range from about 0.1% to about 8% of the total volume of the composite. Still further the fiber material can range from about 0.6% to about 3% of the total volume of the composite. The coordinating material can range from about 0.01% to about 70% of the total volume of the composite. Still further the coordinating material can range from about to about 1% to about 50% of the total volume of the composite.

The combination of mineral-based material and reinforcing fibers mixtures may be mixed with any tools known to those in the art such as mechanical mixers, manual mixing, or specialized processes such as the hatschek process.

The mineral-based material may be cured according to any method known to those in the art. The curing method should be chosen to provide the desired properties of the hardened mineral-based material, such as, durability, strength, water tightness, fire performance, abrasion resistance, volume stability, and resistance to freezing and thawing and deicer salts. The method chosen for curing should also provide surface strength development in the mineral-based material. Curing methods should assist in the chemical reaction called hydration. An example temperature range may be from 40° F. to 75° F. When desired, other curing methods such as steam curing or autoclaving may be used. Steam curing may be performed at atmospheric pressures, where temperatures may be from about 40° F. to about 200° F. at various periods in the process. During autoclaving, curing may be performed under any pressure known in the art and generally at high temperature as known in the art.

The reinforced mineral based material may be tested according to any known method in the art. The mineral based material may be tested in the hardened state or in the freshly mixed state. For example the mineral-based it material may be subjected to a slump, flow, air-content, unit weight, compressive strength tests, tensile strength, dimensional stability, and flexure tests.

Slump and flow are both measures of consistency, or relative ability of the mineral-based material to flow and compact. If the mineral-based material cannot flow because the consistency or slump is too low, there are potential problems with proper consolidation. If the mineral-based material will not stop flowing because the slump is too high, there are potential problems with mortar loss through the formwork, excessive formwork pressures, finishing delays and segregation. Air content measures the total air content in a sample of fresh mineral-based material mix, but does not indicate what the final in-place air content will be, because a certain amount of air is lost in transportation, consolidating, placement and finishing. Three field tests are widely specified: the pressure meter and volumetric method are ASTM standards and the Chace Indicator is an AASHTO procedure. Unit weight measures the weight of a known volume of fresh mineral-based material. Compressive strength is tested by pouring cylinders or cubes of fresh mineral based material and measuring the force needed to break the mineral-based material cylinders at proscribed intervals as they harden. Tensile strength may be measured indirectly by applying a compressive load along the length of a cylindrical sample of mineral based material, inducing a tensile stress. Dimensional stability can be measured by monitoring change in length of mineral-based materials fitted with rigid gauge studs.

Figure 1:
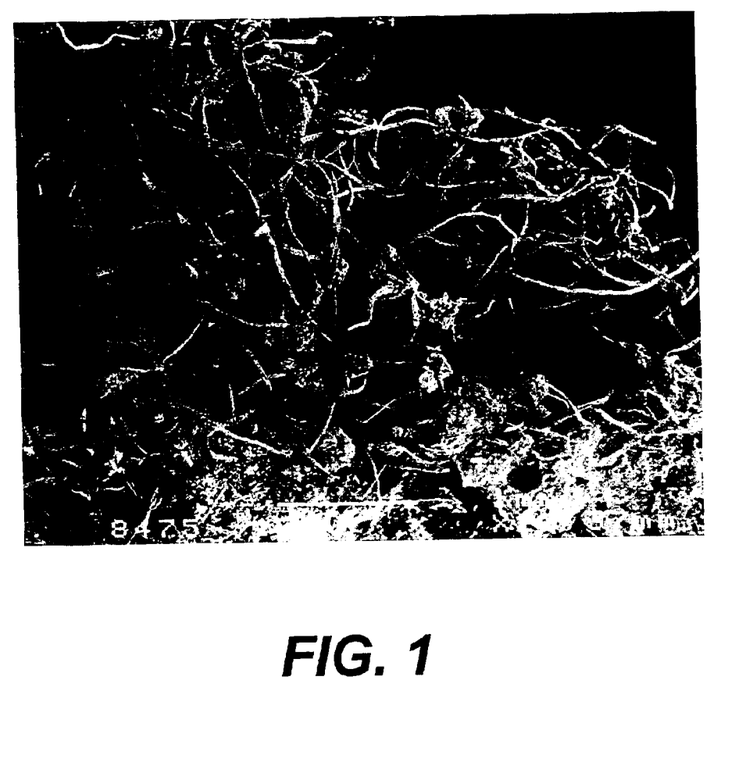
FIG. 1 illustrates the flocculation and distribution of untreated softwood pulp fibers in Portland cement mortar.
Figure 2:
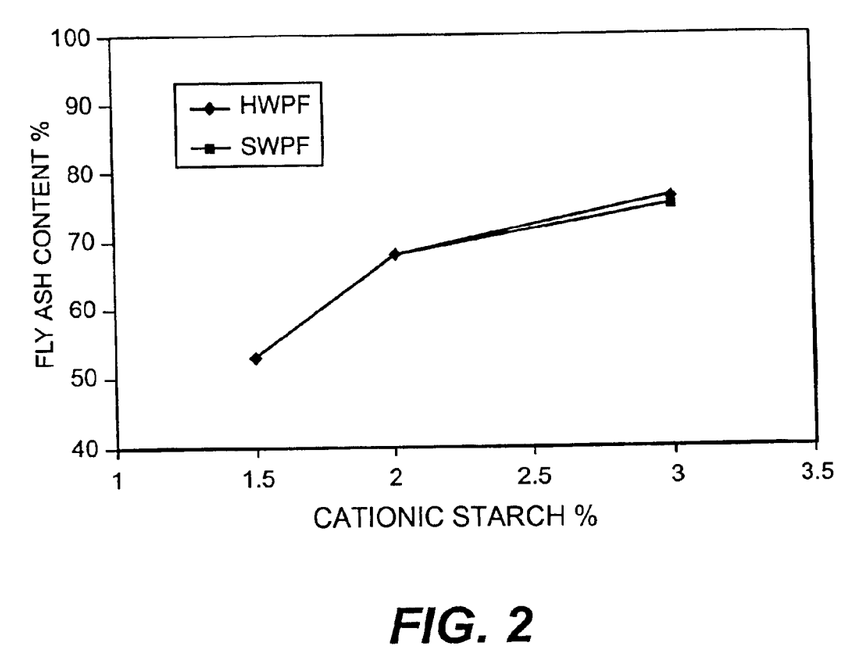
FIG. 2 illustrates the relationship between cationic starch and fly ash or silica fume and adsorption to the fiber surface.
Figure 3:
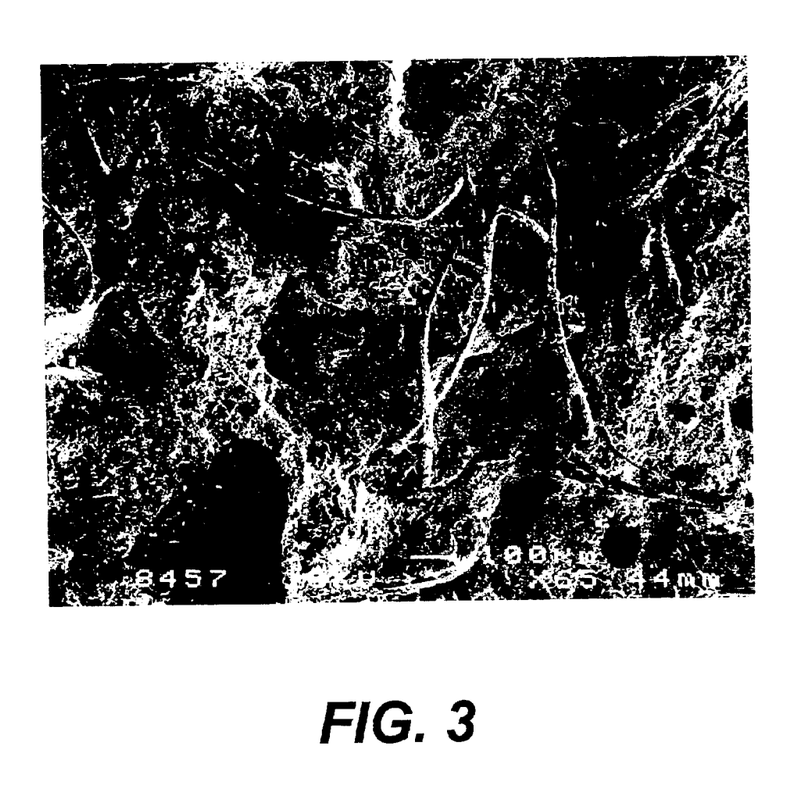
FIG. 3 illustrates dispersion of treated softwood fibers in Portland cement mortars according to the present invention.
Figure 4:
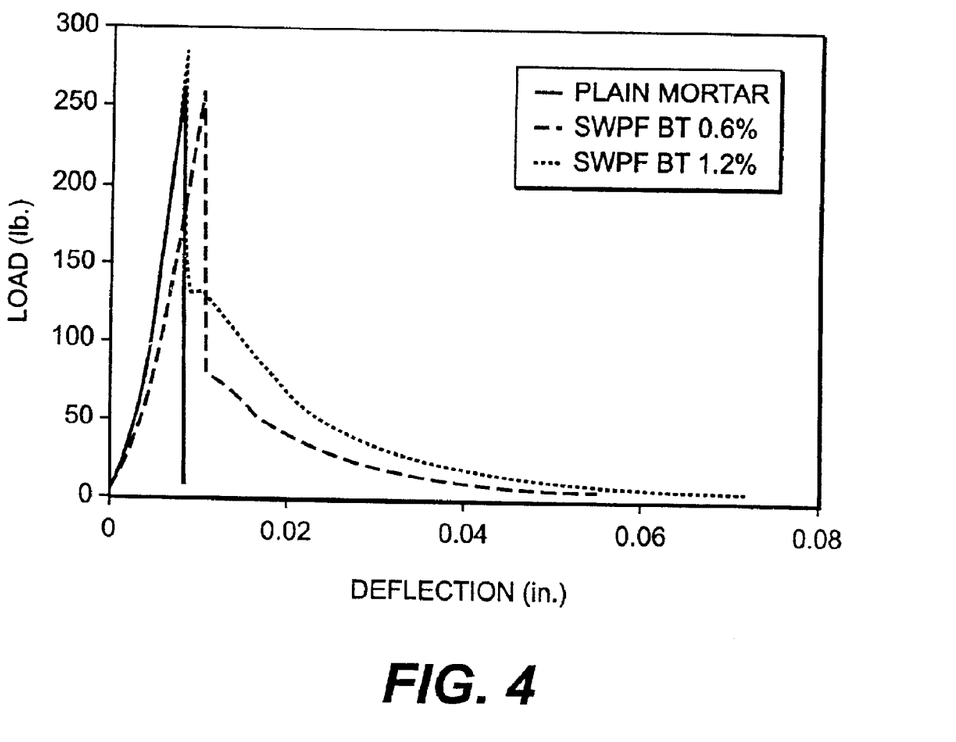
FIG. 4 compares load vs. deflection for unreinforced mortar and mortar reinforced with treated softwood pulp fiber according to the present invention.

The test data are seen in FIGS. 4, 5, 6, and 7. FIG. 4 shows load vs. deflection curves for unreinforced mortar and mortar reinforced with treated softwood pulp fiber at volume fraction (per total sample volume) of 0.6% and 1.2%. The fiber reinforced samples show significantly improved toughness, when compared to the unreinforced sample. In addition, flexural strength is retained, showing that the fibers enhance properties of the composite and do not act as inclusions or stress-raisers.

Figure 5:
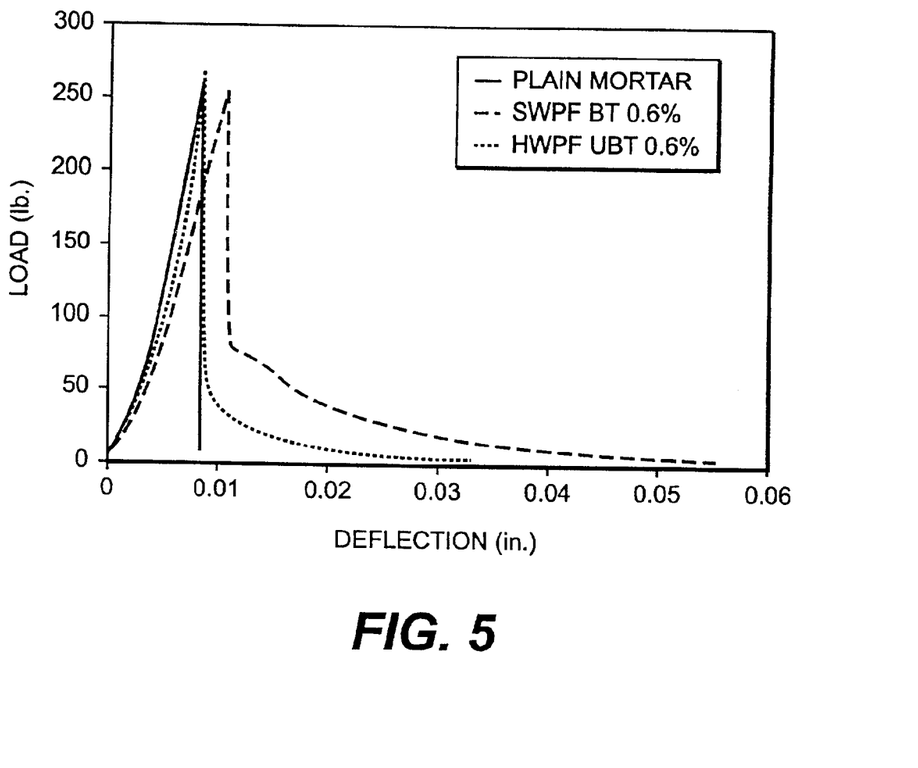
FIG. 5 illustrates load vs. deflection for unreinforced mortar and mortar reinforced with treated hardwood fiber and treated softwood fiber according to the present invention.

FIG. 5 shows load vs. deflection data for unreinforced mortar and mortar reinforced with treated hardwood fiber and treated softwood fiber, both at 0.6% fiber volume fraction. The hardwood fiber reinforced sample also shows improved toughness, while retaining flexural strength. However, the softwood fibers tend to improve toughness more than the hardwood fibers. Without being bound by theory, this is believed to be due to the greater length of the softwood fibers which are typically 4–6 mm in length, while hardwood fibers are typically ~1 mm in length.

Figure 6:
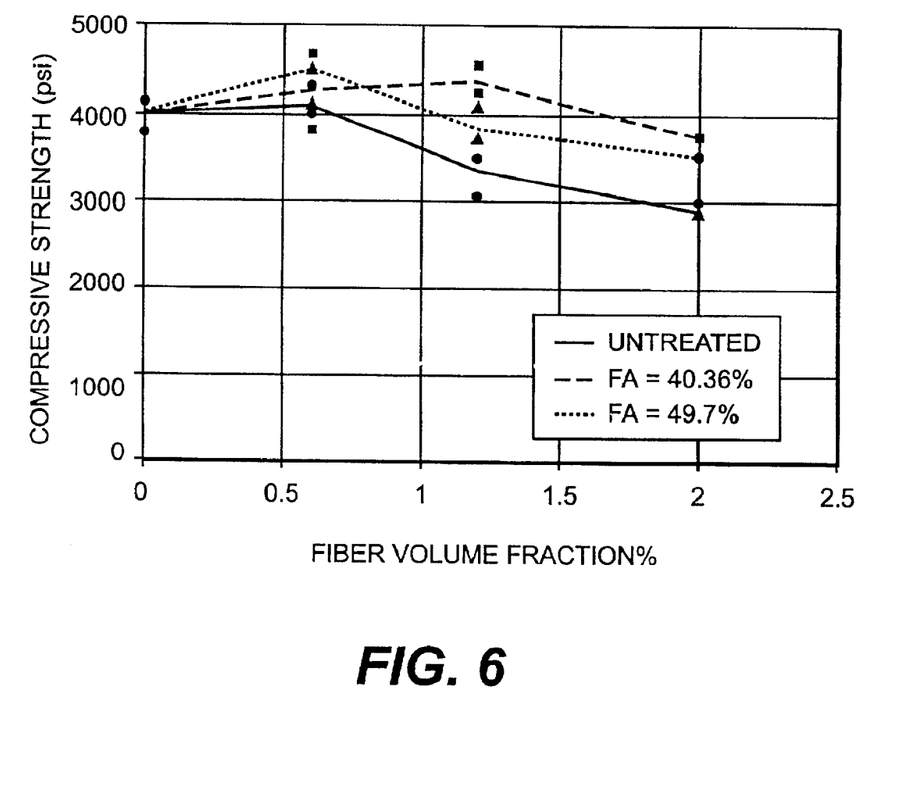
FIG. 6 illustrates comparative data of the compressive strength of mineral-based materials, cured for a period of seven days, according to the present invention.

FIG. 6 illustrates comparative data of the compressive strength of mineral-based materials for a period of seven days according to the present invention. The data shows that the reinforced fiber material increases the compressive strength of the mineral-based material.

Figure 7:
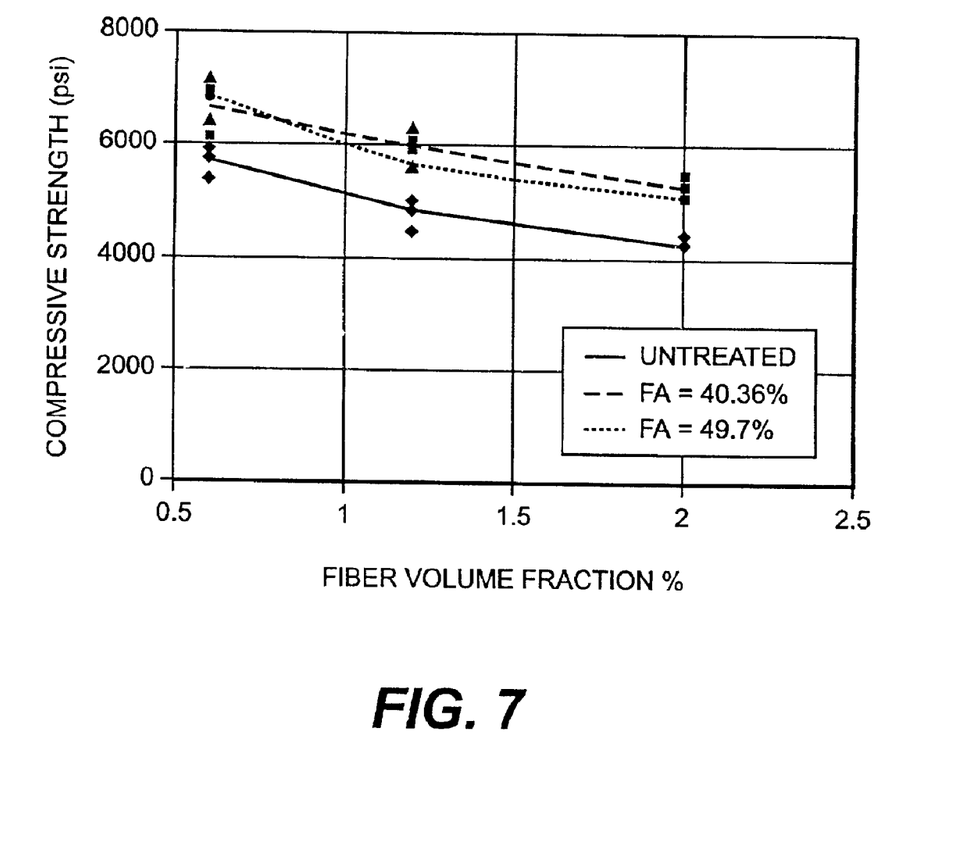
FIG. 7 illustrates comparative data of the compressive strength of mineral-based materials, cured for a period of twenty-eight days, according to the present invention.

FIG. 7 illustrates comparative data of the compressive strength of mineral-based materials for a period of twenty-eight days according to the present invention. Again, the data shows that the reinforced fiber material increases the compressive strength of the mineral-based material.

The present invention will now be described by way of example. The examples are not limiting of the invention as claimed.

EXAMPLES

Example 1

Effect of Fiber Treatment on the Compressive Strength at Fiber Volume Fraction 2.0% for Seven Days

TABLE 1

| Sample No. | Vf | Age | Dim. (in) | Load (lb) | Strength (psi) | Fly Ash % |
|---|---|---|---|---|---|---|
| Control | 0 | 3 | 2*2*2 | 10470 | 2617 | 0 |
| Control | 0 | 3 | 2*2*2 | 10360 | 2590 | 0 |
| Control | 0 | 3 | 2*2*2 | 10050 | 2512 | 0 |
| Control Avr | 0 | 3 | 2*2*2 | 10293 | 2573 | 0 |
| Control | 0 | 7 | 2*2*2 | 15100 | 3775 | 0 |
| Control | 0 | 7 | 2*2*2 | 16530 | 4132 | 0 |
| Control | 0 | 7 | 2*2*2 | 16440 | 4110 | 0 |
| Control Avr | 0 | 7 | 2*2*2 | 16023 | 4005 | 0 |

Table 1 shows the compressive strength of mineral-based materials without any fiber volume fraction for a three and seven day period. Vf represents fiber volume fraction in percent. Age represents the number of days of curing. The dimensions of the mineral-based material is 2 inches in width by 2 inches in height by 2 inches in depth. The load is measured in pounds (lb). The strength is measured in pounds per square inch (psi).

TABLE 2

| Sample No. | Vf | Age | Dim. (in) | Load (lb) | Strength (psi) | Fly Ash % |
|---|---|---|---|---|---|---|
| 3 | 2 | 7 | 2*2*2 | 11330 | 2832 | 0 |
| 3 | 2 | 7 | 2*2*2 | 12120 | 3030 | 0 |
| 3 | 2 | 7 | 2*2*2 | 11640 | 2910 | 0 |
| 3 Avr | 2 | 7 | 2*2*2 | 11696 | 2924 | 0 |

Table 2 shows the compressive strength of mineral-based material with 2% fiber volume fraction after a curing period of seven days without any fiber treatment. Vf represents fiber volume fraction in percent. Age represents the number of days of curing. The dimensions of the mineral-based material is 2 inches in width by 2 inches in height by 2 inches in depth. The load is measured in pounds (lb). The strength is measured in pounds per square inch (psi).

TABLE 3

| Sample No. | Vf | Age | Dim. (in) | Load (lb) | Strength (psi) | Fly Ash % |
|---|---|---|---|---|---|---|
| 23 | 2 | 7 | 2*2*2 | 14390 | 3597 | 40 |
| 23 | 2 | 7 | 2*2*2 | 15420 | 3855 | 40 |
| 23 | 2 | 7 | 2*2*2 | 15420 | 3855 | 40 |
| 23 Avr | 2 | 7 | 2*2*2 | 15076 | 3769 | 40 |

Table 3 shows the compressive strength of mineral-based material with fiber volume fraction after a curing period of seven days. The fibers are treated with fly ash represented in percentage. Vf represents fiber volume fraction in percent. Age represents the number of days curing. The dimensions of the based material is 2 inches in width by 2 inches in height by 2 inches in depth. The load is measured in pounds (lb). The strength is measured in pounds per square inch (psi).

TABLE 4

| Sample No. | Vf | Age | Dim. (in) | Load (lb) | Strength (psi) | Fly Ash % |
|---|---|---|---|---|---|---|
| 19 | 2 | 7 | 2*2*2 | 14320 | 3580 | 49 |
| 19 | 2 | 7 | 2*2*2 | 13610 | 3402 | 49 |
| 19 | 2 | 7 | 2*2*2 | 14670 | 3667 | 49 |
| 19 Avr | 2 | 7 | 2*2*2 | 14200 | 3550 | 49 |

Table 4 shows the compressive strength of mineral-based material with 2% fiber volume fraction after a curing period of seven days. The fibers are treated with fly ash represented in percentage by mass. Vf represents fiber volume fraction in percent. Age represents the number of days curing. The dimensions of the mineral-based material is 2 inches in width by 2 inches in height by 2 inches in depth. The load is measured in pounds (lb). The strength is measured in pounds per square inch (psi).

TABLE 5

| Vf | Fly Ash % | Load (lb) | Strength (psi) |
|---|---|---|---|
| 2 | 0 | 11696 | 2924 |
| 2 | 40 | 15076 | 3769 |
| 2 | 49 | 14200 | 3550 |

Table 5 shows a comparison of the compressive strength of the mineral-based material after a seven day curing period. The table shows that the mineral-based materials treated with fly ash has an improved strength when compared with fibers not treated with fly ash.

Example 2

Effect of Fiber Treatment on the Compressive Strength at Fiber Volume Fraction 1.2% for Seven Days

TABLE 6

| Sample No. | Vf | Age | Dim. (in) | Load (lb) | Strength (psi) | Fly Ash % |
|---|---|---|---|---|---|---|
| Control | 0 | 3 | 2*2*2 | 10470 | 2617 | 0 |
| Control | 0 | 3 | 2*2*2 | 10360 | 2590 | 0 |
| Control | 0 | 3 | 2*2*2 | 10050 | 2512 | 0 |
| Control Avr | 0 | 3 | 2*2*2 | 10293 | 2573 | 0 |
| Control | 0 | 7 | 2*2*2 | 15100 | 3775 | 0 |
| Control | 0 | 7 | 2*2*2 | 16530 | 4132 | 0 |
| Control | 0 | 7 | 2*2*2 | 16440 | 4110 | 0 |
| Control Avr | 0 | 7 | 2*2*2 | 16023 | 4005 | 0 |

Table 6 shows the compressive strength of mineral-based materials without any fiber volume fraction cured for either a three and seven day period. Vf represents fiber volume fraction in percent. Age represents the number of days of curing. The dimensions of the mineral-based material is 2 inches in width by 2 inches in height by 2 inches in depth. The load is measured in pounds (lb). The strength is measured in pounds per square inch (psi).

TABLE 7

| Sample No. | Vf | Age | Dim. (in) | Load (lb) | Strength (psi) | Fly Ash % |
|---|---|---|---|---|---|---|
| 3 | 1.2 | 7 | 2*2*2 | 14010 | 3502 | 0 |
| 3 | 1.2 | 7 | 2*2*2 | 12180 | 3045 | 0 |

TABLE 7-continued

| Sample No. | Vf | Age | Dim. (in) | Load (lb) | Strength (psi) | Fly Ash % |
|---|---|---|---|---|---|---|
| 3 | 1.2 | 7 | 2*2*2 | 14100 | 3525 | 0 |
| 3 Avr | 1.2 | 7 | 2*2*2 | 13430 | 3357 | 0 |

Table 7 shows the compressive strength of mineral-based material with 1.2% fiber volume fraction without any fiber treatment after curing for a period of seven days. Vf represents fiber volume fraction in percent. Age represents the number of days of curing. The dimensions of the mineral-based material is 2 inches in width by 2 inches in height by 2 inches in depth. The load is measured in pounds (lb). The strength is measured in pounds per square inch (psi).

TABLE 8

| Sample No. | Vf | Age | Dim. (in) | Load (lb) | Strength (psi) | Fly Ash % |
|---|---|---|---|---|---|---|
| 23 | 1.2 | 7 | 2*2*2 | 18290 | 4572 | 40 |
| 23 | 1.2 | 7 | 2*2*2 | 17000 | 4250 | 40 |
| 23 | 1.2 | 7 | 2*2*2 | 17140 | 4285 | 40 |
| 23 Avr | 1.2 | 7 | 2*2*2 | 17476 | 4369 | 40 |

Table 8 shows the compressive strength of mineral-based material with 1.2% fiber volume fraction after curing for a period of seven days. The fibers are treated with fly ash represented in percentage. Vf represents fiber volume fraction in percent. Age represents the number of days of curing. The dimensions of the mineral-based material is 2 inches in width by 2 inches in height by 2 inches in depth. The load is measured in pounds (lb). The strength is measured in pounds per square inch (psi).

TABLE 9

| Sample No. | Vf | Age | Dim. (in) | Load (lb) | Strength (psi) | Fly Ash % |
|---|---|---|---|---|---|---|
| 19 | 1.2 | 7 | 2*2*2 | 16410 | 4102 | 49 |
| 19 | 1.2 | 7 | 2*2*2 | 15060 | 3765 | 49 |
| 19 | 1.2 | 7 | 2*2*2 | 14870 | 3717 | 49 |
| 19 Avr | 1.2 | 7 | 2*2*2 | 15446 | 3861 | 49 |

Table 9 shows the compressive strength of mineral-based material with 1.2% fiber volume fraction after curing for a period of seven days. The fibers are treated with fly ash represented in percentage. Vf represents fiber volume fraction in percent. Age represents the number of days of curing. The dimensions of the mineral-based material is 2 inches in width by 2 inches in height by 2 inches in depth. The load is measured in pounds (lb). The strength is measured in pounds per square inch (psi).

TABLE 10

| Vf | Fly Ash % | Load (lb) | Strength (psi) |
|---|---|---|---|
| 1.2 | 0 | 13430 | 3357 |
| 1.2 | 40 | 17476 | 4369 |
| 1.2 | 49 | 15446 | 3861 |

Table 10 shows a comparison of the compressive strength of the mineral-based material, cured for a seven day period. The table shows that the mineral-based materials treated with fly ash has an improved strength when compared with fibers not treated with fly ash.

Example 3

Effect of Fiber Treatment on the Compressive Strength at Fiber Volume Fraction 0.6% for Seven Days

TABLE 11

| Sample No. | Vf | Age | Dim. (in) | Load (lb) | Strength (psi) | Fly Ash % |
|---|---|---|---|---|---|---|
| Control | 0 | 3 | 2*2*2 | 10470 | 2617 | 0 |
| Control | 0 | 3 | 2*2*2 | 10360 | 2590 | 0 |
| Control | 0 | 3 | 2*2*2 | 10050 | 2512 | 0 |
| Control Avr | 0 | 3 | 2*2*2 | 10293 | 2573 | 0 |
| Control | 0 | 7 | 2*2*2 | 15100 | 3775 | 0 |
| Control | 0 | 7 | 2*2*2 | 16530 | 4132 | 0 |
| Control | 0 | 7 | 2*2*2 | 16440 | 4110 | 0 |
| Control Avr | 0 | 7 | 2*2*2 | 16023 | 4005 | 0 |

Table 11 shows the compressive strength of mineral-based materials without any fiber volume fraction cured for periods of either three or seven days. Vf represents fiber volume fraction in percent. Age represents the number of days of curing. The dimensions of the mineral-based material is 2 inches in width by 2 inches in height by 2 inches in depth. The load is measured in pounds (lb). The strength is measured in pounds per square inch (psi).

TABLE 12

| Sample No. | Vf | Age | Dim. (in) | Load (lb) | Strength (psi) | Fly Ash % |
|---|---|---|---|---|---|---|
| 3 | 0.6 | 7 | 2*2*2 | 16370 | 4092 | 0 |
| 3 | 0.6 | 7 | 2*2*2 | 15930 | 3982 | 0 |
| 3 | 0.6 | 7 | 2*2*2 | 16380 | 4095 | 0 |
| 3 Avr | 0.6 | 7 | 2*2*2 | 16226 | 4056 | 0 |

Table 12 shows the compressive strength of mineral-based material with 0.6% fiber volume fraction without any fiber treatment cured for a period of seven dayst. Vf represents fiber volume fraction in percent. Age represents the number of days of curing prior to testing. The dimensions of the mineral-based material is 2 inches in width by 2 inches in height by 2 inches in depth. The load is measured in pounds (lb). The strength is measured in pounds per square inch (psi).

TABLE 13

| Sample No. | Vf | Age | Dim. (in) | Load (lb) | Strength (psi) | Fly Ash % |
|---|---|---|---|---|---|---|
| 23 | 0.6 | 7 | 2*2*2 | 15270 | 3817 | 40 |
| 23 | 0.6 | 7 | 2*2*2 | 18630 | 4657 | 40 |
| 23 | 0.6 | 7 | 2*2*2 | 17210 | 4302 | 40 |
| 23 Avr | 0.6 | 7 | 2*2*2 | 17036 | 4259 | 40 |

Table 13 shows the compressive strength of mineral-based material with 0.6% fiber volume fraction cured for a period of seven days. The fibers are treated with fly ash represented in percentage. Vf represents fiber volume fraction in percent. Age represents the number of days of curing. The dimensions of the mineral-based material is 2 inches in width by 2 inches in height by 2 inches in depth. The load is measured in pounds (lb). The strength is measured in pounds per square inch (psi).

TABLE 14

| Sample No. | Vf | Age | Dim. (in) | Load (lb) | Strength (psi) | Fly Ash % |
|---|---|---|---|---|---|---|
| 19 | 0.6 | 7 | 2*2*2 | 17730 | 4432 | 49 |
| 19 | 0.6 | 7 | 2*2*2 | 17310 | 4327 | 49 |
| 19 | 0.6 | 7 | 2*2*2 | 18850 | 4712 | 49 |
| 19 Avr | 0.6 | 7 | 2*2*2 | 17963 | 4490 | 49 |

Table 14 shows the compressive strength of mineral-based material with 0.6% fiber volume fraction cured for a period of seven days. The fibers are treated with fly ash represented in percentage. Vf represents fiber volume fraction in percent. Age represents the number of days of curing. The dimensions of the mineral-based material is 2 inches in width by 2 inches in height by 2 inches in depth. The load is measured in pounds (lb). The strength is measured in pounds per square inch (psi).

TABLE 15

| Vf | Fly Ash % | Load (lb) | Strength (psi) |
|---|---|---|---|
| 0.6 | 0 | 16226 | 4056 |
| 0.6 | 40.36 | 17036 | 4259 |
| 0.6 | 49.7 | 17963 | 4490 |

Table 15 shows a comparison of the compressive strength of the mineral-based material cured for a seven day period prior to testing. The table shows that the mineral-based materials treated with fly ash has an improved strength when compared with fibers not treated with fly ash.

Example 4

Effect of Fiber Treatment on the Compressive Strength at Fiber Volume Fraction 2% for Twenty-Eight Days

TABLE 16

| Sample No. | Vf | Age | Dim. (in) | Load (lb) | Strength (psi) | Fly Ash % |
|---|---|---|---|---|---|---|
| 3 | 2 | 28 | 2*2*2 | 16760 | 4190 | 0 |
| 3 | 2 | 28 | 2*2*2 | 17470 | 4367 | 0 |
| 3 | 2 | 28 | 2*2*2 | 16810 | 4202 | 0 |
| 3 Avr | 2 | 28 | 2*2*2 | 17013 | 4253 | 0 |

Table 16 shows the compressive strength of mineral-based material with 2% fiber volume fraction without any fiber treatment cured for a period of twenty eight days. Vf represents fiber volume fraction in percent. Age represents the number of days of curing. The dimensions of the mineral-based material is 2 inches in width by 2 inches in height by 2 inches in depth. The load is measured in pounds (lb). The strength is measured in pounds per square inch (psi).

TABLE 17

| Sample No. | Vf | Age | Dim. (in) | Load (lb) | Strength (psi) | Fly Ash % |
|---|---|---|---|---|---|---|
| 23 | 2 | 28 | 2*2*2 | 20270 | 5067 | 40 |
| 23 | 2 | 28 | 2*2*2 | 21140 | 5285 | 40 |
| 23 | 2 | 28 | 2*2*2 | 21810 | 5452 | 40 |
| 23 Avr | 2 | 28 | 2*2*2 | 21073 | 5268 | 40 |

Table 17 shows the compressive strength of mineral-based material with 2% fiber volume fraction cured for a period of twenty eight days. Vf represents fiber volume fraction in percent. Age represents the number of days of curing before testing. The dimensions of the mineral-based material is 2 inches in width by 2 inches in height by 2 inches in depth. The load is measured in pounds (lb). The strength is measured in pounds per square inch (psi).

TABLE 18

| Sample No. | Vf | Age | Dim. (in) | Load (lb) | Strength (psi) | Fly Ash % |
|---|---|---|---|---|---|---|
| 19 | 2 | 28 | 2*2*2 | 18260 | 4565 | 49 |
| 19 | 2 | 28 | 2*2*2 | 21680 | 5420 | 49 |
| 19 | 2 | 28 | 2*2*2 | 20010 | 5002 | 49 |
| 19 Avr | 2 | 28 | 2*2*2 | 19983 | 4995 | 49 |

Table 18 shows the compressive strength of mineral-based material with 2% fiber volume fraction cured for a period of twenty eight days. Vf represents fiber volume fraction in percent. Age represents the number of days of curing prior to testing. The dimensions of the mineral-based material is 2 inches in width by 2 inches in height by 2 inches in depth. The load is measured in pounds (lb). The strength is measured in pounds per square inch (psi).

Table 19

| Vf | Fly Ash % | Load (lb) | Strength (psi) |
|---|---|---|---|
| 2 | 0 | 17013 | 4253 |
| 2 | 40 | 21073 | 5268 |
| 2 | 49 | 19983 | 4995 |

Table 19 shows a comparison of the compressive strength of the mineral-based material cured for a twenty-eight day period. The table shows that the mineral-based materials treated with fly ash has an improved strength when compared with fibers not treated with fly ash.

Example 5

Effect of Fiber Treatment on the Compressive Strength at Fiber Volume Fraction 1.2% for Twenty-Eight Days

TABLE 20

| Sample No. | Vf | Age | Dim. (in) | Load (lb) | Strength (psi) | Fly Ash % |
|---|---|---|---|---|---|---|
| 3 | 1.2 | 28 | 2*2*2 | 20050 | 5012 | 0 |
| 3 | 1.2 | 28 | 2*2*2 | 19610 | 4902 | 0 |
| 3 | 1.2 | 28 | 2*2*2 | 18380 | 4595 | 0 |
| 3 Avr | 1.2 | 28 | 2*2*2 | 19346 | 4836 | 0 |

Table 20 shows the compressive strength of mineral-based material with 1.2% fiber volume fraction without any fiber treatment cured for a period of twenty eight days. Vf represents fiber volume fraction in percent. Age represents the number of days of curing prior to testing. The dimensions of the mineral-based material is 2 inches in width by 2 inches in height by 2 inches in depth. The load is measured in pounds (lb). The strength is measured in pounds per square inch (psi).

TABLE 21

| Sample No. | Vf | Age | Dim. (in) | Load (lb) | Strength (psi) | Fly Ash % |
|---|---|---|---|---|---|---|
| 23 | 1.2 | 28 | 2*2*2 | 24120 | 6030 | 40 |
| 23 | 1.2 | 28 | 2*2*2 | 23980 | 5995 | 40 |
| 23 | 1.2 | 28 | 2*2*2 | 23110 | 5777 | 40 |
| 23 Avr | 1.2 | 28 | 2*2*2 | 23736 | 5934 | 40 |

Table 21 shows the compressive strength of mineral-based material with 1.2% fiber volume fraction cured for a period of twenty eight days. Vf represents fiber volume fraction in percent. Age represents the number of days of curing prior to testing. The dimensions of the mineral-based material is 2 inches in width by 2 inches in height by 2 inches in depth. The load is measured in pounds (lb). The strength is measured in pounds per square inch (psi).

TABLE 22

| Sample No. | Vf | Age | Dim. (in) | Load (lb) | Strength (psi) | Fly Ash % |
|---|---|---|---|---|---|---|
| 19 | 1.2 | 28 | 2*2*2 | 20100 | 5025 | 49 |
| 19 | 1.2 | 28 | 2*2*2 | 25200 | 6300 | 49 |
| 19 | 1.2 | 28 | 2*2*2 | 22410 | 5602 | 49 |
| 19 Avr | 1.2 | 28 | 2*2*2 | 22570 | 5642 | 49 |

Table 22 shows the compressive strength of mineral-based material with 1.2% fiber volume fraction cured for a period of twenty eight days. Vf represents fiber volume fraction in percent. Age represents the number of days of curing prior to testing. The dimensions of the mineral-based material is 2 inches in width by 2 inches in height by 2 inches in depth. The load is measured in pounds (lb). The strength is measured in pounds per square inch (psi).

TABLE 23

| Vf | Fly Ash % | Load (lb) | Strength (psi) |
|---|---|---|---|
| 1.2 | 0 | 19346 | 4836 |
| 1.2 | 40 | 23736 | 5934 |
| 1.2 | 49 | 22570 | 5642.5 |

Table 23 shows a comparison of the compressive strength of the mineral-based material cured for a twenty-eight day period. The table shows that the mineral-based materials treated with fly ash has an improved strength when compared with fibers not treated with fly ash.

Example 6

Effect of Fiber Treatment on the Compressive Strength at Fiber Volume Fraction 0.6% for Twenty-Eight Days

TABLE 24

| Sample No. | Vf | Age | Dim. (in) | Load (lb) | Strength (psi) | Fly Ash % |
|---|---|---|---|---|---|---|
| 3 | 0.6 | 28 | 2*2*2 | 21540 | 5385 | 0 |
| 3 | 0.6 | 28 | 2*2*2 | 23030 | 5757 | 0 |
| 3 | 0.6 | 28 | 2*2*2 | 23530 | 5882 | 0 |
| 3 Avr | 0.6 | 28 | 2*2*2 | 22700 | 5675 | 0 |

Table 24 shows the compressive strength of mineral-based material with 0.6% fiber volume fraction without any fiber treatment cured for a period of twenty eight days. Vf represents fiber volume fraction in percent. Age represents the number of days of curing prior to testing. The dimensions of the mineral-based material is 2 inches in width by 2 inches in height by 2 inches in depth. The load is measured in pounds (lb). The strength is measured in pounds per square inch (psi).

TABLE 25

| Sample No. | Vf | Age | Dim. (in) | Load (lb) | Strength (psi) | Fly Ash % |
|---|---|---|---|---|---|---|
| 23 | 0.6 | 28 | 2*2*2 | 27920 | 6980 | 40 |
| 23 | 0.6 | 28 | 2*2*2 | 24430 | 6107 | 40 |
| 23 | 0.6 | 28 | 2*2*2 | 27750 | 6937 | 40 |
| 23 Avr | 0.6 | 28 | 2*2*2 | 26700 | 6675 | 40 |

Table 25 shows the compressive strength of mineral-based material with 0.6% fiber volume fraction cured for a period of twenty eight days. Vf represents fiber volume fraction in percent. Age represents the number of days of curing prior to testing. The dimensions of the mineral-based material is 2 inches in width by 2 inches in height by 2 inches in depth. The load is measured in pounds (lb). The strength is measured in pounds per square inch (psi).

TABLE 26

| Sample No. | Vf | Age | Dim. (in) | Load (lb) | Strength (psi) | Fly Ash % |
|---|---|---|---|---|---|---|
| 19 | 0.6 | 28 | 2*2*2 | 25500 | 6375 | 49 |
| 19 | 0.6 | 28 | 2*2*2 | 28570 | 7142 | 49 |
| 19 | 0.6 | 28 | 2*2*2 | 27600 | 6900 | 49 |
| 19 Avr | 0.6 | 28 | 2*2*2 | 27223 | 6805 | 49 |

Table 26 shows the compressive strength of mineral-based material with 0.6% fiber volume fraction cured for a period of twenty-eight days. Vf represents fiber volume fraction in percent. Age represents the number of days of curing prior to testing. The dimensions of the mineral-based material is 2 inches in width by 2 inches in height by 2 inches in depth. The load is measured in pounds (lb). The strength is measured in pounds per square inch (psi).

TABLE 27

| Vf | Fly Ash % | Load (lb) | Strength (psi) |
|---|---|---|---|
| 0.6 | 0 | 22700 | 5675 |
| 0.6 | 40 | 26700 | 6675 |
| 0.6 | 4 | 27223 | 6805 |

Table 27 shows a comparison of the compressive strength of the mineral-based material cured for a twenty-eight day period. The table shows that the mineral-based materials treated with fly ash has an improved strength when compared with fibers not treated with fly ash.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A method for reinforcing mineral-based material comprising:
  providing at least one reinforced fiber material comprising at least one cellulosic fiber material, at least one coordinating material, and water, wherein when the coordinating material comprises an inorganic coordinating material, the inorganic coordinating material is introduced in the form of a slurry, and, mixing at least one mineral-based material with the at least one reinforced fiber material.

2. The method according to claim 1, wherein the coordinating material is chosen from at least one of silica-rich materials including fly ash and silica fume; slag; aluminosilicates including heat-treated clay, metakeolin, and clay; fines from crushed rock; fine sand; silica gel; talc; calcium carbonates including precipitated calcium carbonate and grounded calcium carbonate; aluminum sulfate; wood ash; polymers that can adsorb or bend to fiber materials including anionic polymers and cationic polymers including potato starch and corn starch; surfactants; water; and saw dust.

3. The method according to claim 2, wherein the silica-rich material is chosen from at least one of silica fume and fly ash.

4. The method according to claim 3, wherein the silica-rich material is silica fume.

5. The method according to claim 3, wherein the silica-rich material is fly ash.

6. The method according to claim 2, wherein the cationic polymer is chosen from at least one of starch and surfactant.

7. The method according to claim 6, wherein the starch is chosen from at least one of potato starch and corn starch.

8. The method according to claim 1, wherein the cellulosic fiber material comprises at least one of woody fibers, non-woody fibers, recycled fibers, and mechanical pulp.

9. The method according to claim 8, wherein the woody fibers comprise at least one of hardwood fibers and softwood fibers.

10. The method according to claim 9, wherein the softwood fibers comprise fibers from coniferous trees including slash pine, jack pine, white spruce, logepole pine, redwood, and douglas fir.

11. The method according to claim 9, wherein the hardwood fibers comprise fibers from broad leaf trees including oak, aspen, birch, and beech.

12. The method according to claim 8, wherein the non-woody fibers comprise fibers from at least one of hemp flax, bagasse, mailla, cotton, ramie, jute abaca, banana, kenaf, sisal hemp, wheat, rice, bamboo, and pineapple.

13. The method according to claim 8, wherein the recycled fibers comprise fibers from paper products.

14. The method according to claim 1, wherein the mineral-based material is chosen from at least one of cement based material, clay-based material, asphalt-based material, mortar, concrete, ceramic tile, grout, and terrazzo.

15. The method according to claim 1, wherein the mineral-based material is cement based material.

16. The method according to claim 1, wherein the mineral-based material is mortar.

17. The method according to claim 1 wherein the reinforced mineral based material exhibits reduced early-age cracking and shrinkage cracking.

18. The method according to claim 1 wherein the reinforced mineral based material exhibits improved ductility.

19. The method according to claim 1 wherein the reinforced mineral based material exhibits improved toughness.

20. The method according to claim 1 wherein the reinforced mineral-based material is formed into fiber-cement panels.

21. The method according to claim 1 wherein the reinforced mineral based material is a patch or repair for damaged mineral-based material.

22. A composition comprising at least one mineral-based material and at least one reinforced fiber material, the reinforced fiber material comprising at least one cellulosic fiber material, at least one coordinating material, and water, wherein the cellulosic fiber material is treated with the at least one coordinating material prior to contacting the at least one mineral-based material, and wherein when the coordinating material comprises an inorganic coordinating material, the inorganic coordinating material is introduced in the form of a slurry.

23. A composition according to claim 22, wherein the mineral-based material is chosen from at least one of cement based material, clay-based material, asphalt-based material, mortar, concrete, ceramic tile, grout, and terrazzo.

24. A composition according to claim 22, wherein the cellulosic fiber material comprises at least one of woody fibers, non-woody fibers, recycled fibers, and mechanical pulp.

25. A composition according to claim 24, wherein the woody fibers comprise at least one of hardwood fibers and softwood fibers.

26. A composition according to claim 22, wherein the coordinating material is chosen from at least one of silica-rich materials including fly ash and silica fume; slag; aluminosilicates including heat-treated clay, metakaclin, and clay; fines from crushed rock; fine sand; silica gel; talc; calcium carbonates including precipitated calcium carbonate and grounded calcium carbonate; aluminum sulfate; wood ash; polymers that can adsorb or bond to fiber materials including anionic polymers and cationic polymers including potato starch and corn starch; surfactants; water; and saw dust.

27. The composition according to claim 22 wherein the composition exhibits reduced early-age cracking or shrinkage cracking.

28. The composition according to claim 22 wherein the composition exhibits improved ductility.

29. The composition according to claim 22 wherein the composition exhibits improved toughness.

30. The composition according to claim 22 wherein said composition is in the form of as fiber-cement panels.

31. The composition according to claim 22 wherein the composition is a patch or repair for damaged mineral-based material.

32. The composition according to claim 25, wherein the softwood fibers comprise fibers from coniferous trees including slash pine, jack pine, white spruce, logepole pine, redwood, and douglas fir.

33. The composition according to claim 25, wherein the hardwood fibers comprise fibers from broad leaf trees including oak, aspen, birch, and beech.

34. The composition according to claim 24, wherein the recycled fibers comprise fibers from paper products.

35. The composition according to claim 24, wherein the non-woody fibers comprise fibers from at least one of hemp flax, bagasse, mailla, cotton, ramie, jute abaca, banana, kenaf, sisal hemp, wheat, rice, bamboo, and pineapple.

36. The method according to claim 1, wherein the reinforced fiber material exhibits improved dispersion in the mineral-based material.

37. The composition according to claim 22, wherein the reinforced fiber is uniformly dispersed in the mineral-based material.

38. The method according to claim 1, wherein the reinforced fiber material is dried prior to mixing with the mineral-based material.

39. The method according to claim 2, wherein the coordinating material is at least one cationic polymer and at least one of fly ash and silica fume.

40. The composition according to claim 26, wherein the coordinating material is at least one cationic polymer and at least one of fly ash and silica fume.

* * * * *